US008705374B1

(12) United States Patent
D'Souza et al.

(10) Patent No.: US 8,705,374 B1
(45) Date of Patent: Apr. 22, 2014

(54) METHOD AND APPARATUS FOR ISOLATING LABEL-SWITCHED PATH IMPAIRMENTS

(75) Inventors: Kevin D'Souza, Cranbury, NJ (US); Arvind Ramarajan, Piscataway, NJ (US); Leah Zhang, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 778 days.

(21) Appl. No.: 11/555,132

(22) Filed: Oct. 31, 2006

(51) Int. Cl.
    *H04J 3/14* (2006.01)
    *H04L 12/28* (2006.01)
    *G06F 15/177* (2006.01)

(52) U.S. Cl.
    USPC ........... 370/242; 370/229; 370/400; 370/410; 709/220; 709/238

(58) Field of Classification Search
    USPC .......................... 370/216, 248; 709/227, 245
    See application file for complete search history.

(56) References Cited

U.S. PATENT DOCUMENTS

| | | | | |
|---|---|---|---|---|
| 6,463,061 B1 * | 10/2002 | Rekhter et al. | ................. | 370/392 |
| 7,082,102 B1 * | 7/2006 | Wright | ........................... | 370/229 |
| 7,130,926 B1 * | 10/2006 | Wu et al. | ........................ | 709/250 |
| 7,336,615 B1 * | 2/2008 | Pan et al. | ........................ | 370/248 |
| 7,359,377 B1 * | 4/2008 | Kompella et al. | ............. | 370/389 |
| 7,360,245 B1 * | 4/2008 | Ramachandran et al. | ...... | 726/13 |
| 7,394,811 B2 * | 7/2008 | Gibson et al. | ................. | 370/392 |
| 7,417,950 B2 * | 8/2008 | Hofmeister et al. | .......... | 370/230 |
| 7,463,591 B1 * | 12/2008 | Kompella et al. | ............. | 370/248 |
| 7,558,199 B1 * | 7/2009 | Minei et al. | .................... | 370/230 |
| 7,570,581 B2 * | 8/2009 | Yoshizawa | .................... | 370/218 |
| 7,733,788 B1 * | 6/2010 | Michalski et al. | ............. | 370/242 |
| 7,881,183 B2 * | 2/2011 | Wu et al. | ....................... | 370/216 |
| 2002/0059407 A1 * | 5/2002 | Davies | .......................... | 709/223 |
| 2002/0071390 A1 * | 6/2002 | Reeves et al. | ................. | 370/235 |
| 2002/0156914 A1 * | 10/2002 | Lo et al. | ........................ | 709/238 |
| 2003/0009561 A1 * | 1/2003 | Sollee | ........................... | 709/227 |
| 2004/0096002 A1 * | 5/2004 | Zdepski et al. | .......... | 375/240.26 |
| 2004/0196827 A1 * | 10/2004 | Xu et al. | ........................ | 370/352 |
| 2005/0111351 A1 * | 5/2005 | Shen | .............................. | 370/217 |
| 2005/0129059 A1 * | 6/2005 | Jiang et al. | ..................... | 370/466 |
| 2006/0013209 A1 * | 1/2006 | Somasundaram | ............ | 370/389 |
| 2006/0126495 A1 * | 6/2006 | Guichard et al. | ............. | 370/216 |
| 2006/0221867 A1 * | 10/2006 | Wijnands et al. | ............. | 370/255 |
| 2007/0053359 A1 * | 3/2007 | Wu et al. | ....................... | 370/392 |
| 2007/0280102 A1 * | 12/2007 | Vasseur et al. | ................ | 370/225 |

* cited by examiner

*Primary Examiner* — Marsha D Banks Harold
*Assistant Examiner* — Christopher Wyllie

(57) ABSTRACT

A method and apparatus for diagnosing and isolating label-switched-path impairments in a network are disclosed. For example, the present method receives an impairment notification indicating a potential impairment for at least one label switched path between a source device and a destination device. The method then identifies all routers along each of the at least one label switched path. The method then determines automatically whether each of the routers along each of the at least one label switched path is enabled for exchanging label mapping information. Finally, the method identifies at least one of the at least one label switched path as being impaired if at least one of the routers on the switched path is deemed not enabled for exchanging label mapping information.

8 Claims, 4 Drawing Sheets

200

METHOD AND APPARATUS FOR ISOLATING LABEL-SWITCHED PATH IMPAIRMENTS

The present invention relates generally to communication networks and, more particularly, to a method and apparatus for diagnosing and isolating label-switched-path impairments in networks such as the packet networks, e.g., Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous and more and more businesses and consumers are relying on their Internet connections for much of their voice and data communications. Businesses and consumers connect their routers to the Internet for sending and receiving packets. The routers utilize routing protocols to determine a path for sending the packets. For example, routers may have multiple label-switched paths available for sending packets over a large network. When impairment is reported by a customer, isolating the failure involves checking each label-switched-path that may have been used by a packet to determine whether or not it is working properly. Unfortunately, the service provider's network may have hundreds or possibly thousands of available label-switched paths for the customer's traffic. As such, the checking process is very labor intensive and may require some time before the impairment is isolated. Due to the difficulty in isolating the impairment in a timely manner, it is often the case that the service provider may receive repeated reports from the customer reporting on the same impairments. This often results in dissatisfaction by the customer, thereby leading to potential loss of business.

Therefore, there is a need for a method and apparatus that diagnoses and isolates label-switched-path impairments rapidly and accurately.

SUMMARY OF THE INVENTION

In one embodiment, the present invention discloses a method and apparatus for diagnosing and isolating label-switched-path impairments for packet networks. For example, the present method receives an impairment notification indicating a potential impairment for at least one label switched path between a source device and a destination device. The method then identifies all routers along each of the at least one label switched path. The method then determines automatically whether each of the routers along each of the at least one label switched path is enabled for exchanging label mapping information. Finally, the method identifies at least one of the at least one label switched path as being impaired if at least one of the routers on the switched path is deemed not enabled for exchanging label mapping information.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for diagnosing and isolating label-switched-path impairments in packet networks such as Voice over Internet Protocol (VoIP) and Service over Internet Protocol (SoIP) networks. Although the present invention is discussed below in the context of IP networks, the present invention is not so limited. Namely, the present invention can be applied for other networks such as the cellular networks and the like.

Figure 1:
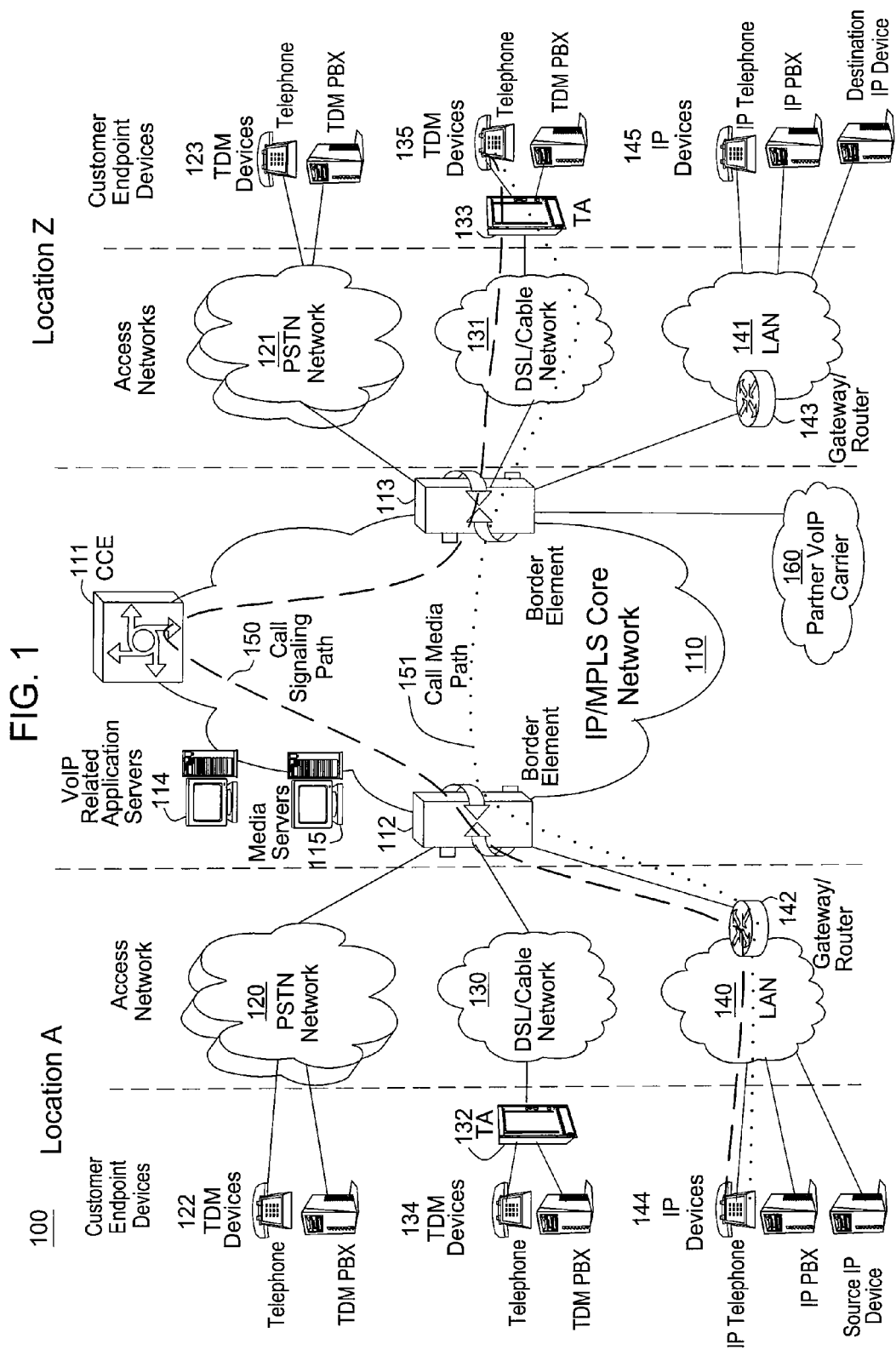
FIG. 1 illustrates an exemplary network related to the present invention.

To better understand the present invention, FIG. 1 illustrates an exemplary network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a Voice over Internet Protocol (VoIP) network or a Service over Internet Protocol (SoIP) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and/or router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on. For calls that originate or terminate in a different carrier, they can be handled through the PSTN 120 and 121 or the Partner IP Carrier 160 interconnections. A customer in location A using any endpoint device type with its associated access network type can communicate with another customer in location Z using any endpoint device type with its associated network type.

The above VoIP network is described to provide an illustrative environment in which data and voice packets are transmitted on communication networks. Businesses and consumers connect their routers to the Internet for sending and receiving packets. The routers utilize routing protocols to determine a path for sending the packets. For example, routers may have multiple label-switched paths available for sending packets over a large network. When impairment is reported by a customer, isolating the failure involves checking each label-switched-path that may have been used by a packet, to determine whether or not it is working properly. Unfortunately, the service provider's network may have a large number of available label-switched paths for the customer's traffic (e.g., hundreds or even thousands). As such, the checking process is very labor intensive and may require some time before the impairment is isolated. Often, the customer may continue to receive lower quality of service while the trouble is being isolated. Due to the difficulty in isolating the impairment in a timely manner, it is often the case that the service provider may receive repeated reports from the customer reporting on the same impairment. This often results in dissatisfaction by the customer, thereby leading to potential loss of business. Therefore, there is a need for a method and apparatus that diagnoses and isolates label-switched-path impairments.

The present invention provides a method and apparatus for diagnosing and isolating label-switched-path impairments in packet networks such as VoIP and SoIP networks. In order to clearly illustrate the teachings of the current invention, the following terminologies and networking concepts will first be described:

Virtual Private Network (VPN);
Customer Edge (CE) device;
Provider Edge (PE) device;
Border Gateway Protocol (BGP)
Label Distribution Protocol (LDP);
Forward Equivalent Class (FEC);
Label Switched Paths (LSP); and
Label Edge Router (LER).

Virtual Private Network (VPN) is a private network that uses a shared network to interconnect multiple sites and users. VPN uses virtual connections routed through the public network to connect remote sites, mobile users, corporate LANs, etc. For example, a VPN may have a LAN at a corporation's main office, remote LANs at branch offices and individual employees connecting mobile devices, etc. The shared network may be the Internet or a network from a service provider.

Customer Edge device refers to a device located at a customer location (or an enterprise LAN) and is used to communicate with a provider edge device as defined below via a data link such as Ethernet, Frame Relay, etc. A customer edge device may be a router or a switch. A customer edge router is a routing peer to the provider edge device to which it is attached but not to other customer edge routers in other sites. For example, the customer edge device provides the addresses at its site to the provider edge device using Border Gateway Protocol (BGP) as described below. For example, for VPN service, routing information about a particular VPN is present only in the PE routers attached to the VPN.

Provider Edge (PE) device refers to a router administered by a network service provider and is used to communicate with customer edge devices. For example, a PE obtains routing information from the customer edge devices using the border gateway protocol. A PE device may be used to attach labels to the customer traffic to identify the network (e.g., VPN) associated with the packet. If the PE is routing internet traffic, it is used to support customers connected through routers with addresses in global routing tables. If the PE is routing VPN traffic, the addresses are not in the global routing tables and will be reachable only by limited routers belonging to the same VPN.

Border Gateway Protocol (BGP) refers to a protocol designed to pass routing information between systems run by different administrators. BGP has methods for passing attributes of routes between a CE and a PE.

Label Distribution Protocol (LDP) is a protocol used to build label-switched router databases by exchanging label mapping information between two label switched routers. Namely, LDP is a protocol that is used as a communication protocol between two label switched routers for the purpose of exchanging label mapping information that can then be used for deriving LSPs.

Forward Equivalent Class (FEC) is a term that describes a set of packets that may be forwarded the same way based on characteristics or requirements. FEC may be defined based on quality of service, destination IP address, etc.

Label Switched Paths (LSPs) refer to pre-provisioned routes across an MPLS network using a signaling protocol such as Label Distribution Protocol (LDP) described above. For example, a sequence of labels is inserted at the beginning of the packets at each device along the path from the source to the destination. The labels contain network protocol and information needed for forwarding packets. The LSPs are setup based on criteria in the Forward Equivalent Class (FEC) defined above.

Label Edge Router (LER) is a router located at the edge of an MPLS network that uses routing information to assign labels to data-grams and forward them into the MPLS domain. Hence, the path for a packet begins at an LER which assigns a label to it based on FEC criteria.

A service provider with an MPLS/IP backbone network may provide services to enterprise customers, e.g. VPN services. Each enterprise location may have Customer Edge device(s) attached Provider Edge (PE) devices. The CEs at a customer location can be deployed on a LAN and the traffic from various endpoint devices can reach the CEs on the LAN. BGP is used for obtaining routing information from the CEs and for distributing routes over the backbone network. For example, Multi Protocol Label Switching (MPLS) can be used for forwarding the packets over the backbone network. MPLS enables the service provider to pre-provision multiple LSPs for the customer using Label Distribution Protocol (LDP). The service provider may implement the LER functionality in a PE device attached to the customer's CE device. Packets reach the PE (with LER functionality) and are assigned the first label based on FEC. The PE then forwards the packets over one of the pre-provisioned paths (LSPs) towards the destination. However, when a customer reports impairment, isolating the LSP with a fault requires examining details about each LSP manually. In one embodiment, an impairment is broadly defined as an MPLS reachability problem between two LERs in a provider network. The process is very time consuming and may reduce the quality of service. The current invention provides a method for isolating where the Label Distribution Protocol (LDP) may have failed between a source and a destination PE and identifies label corruption.

Figure 2:
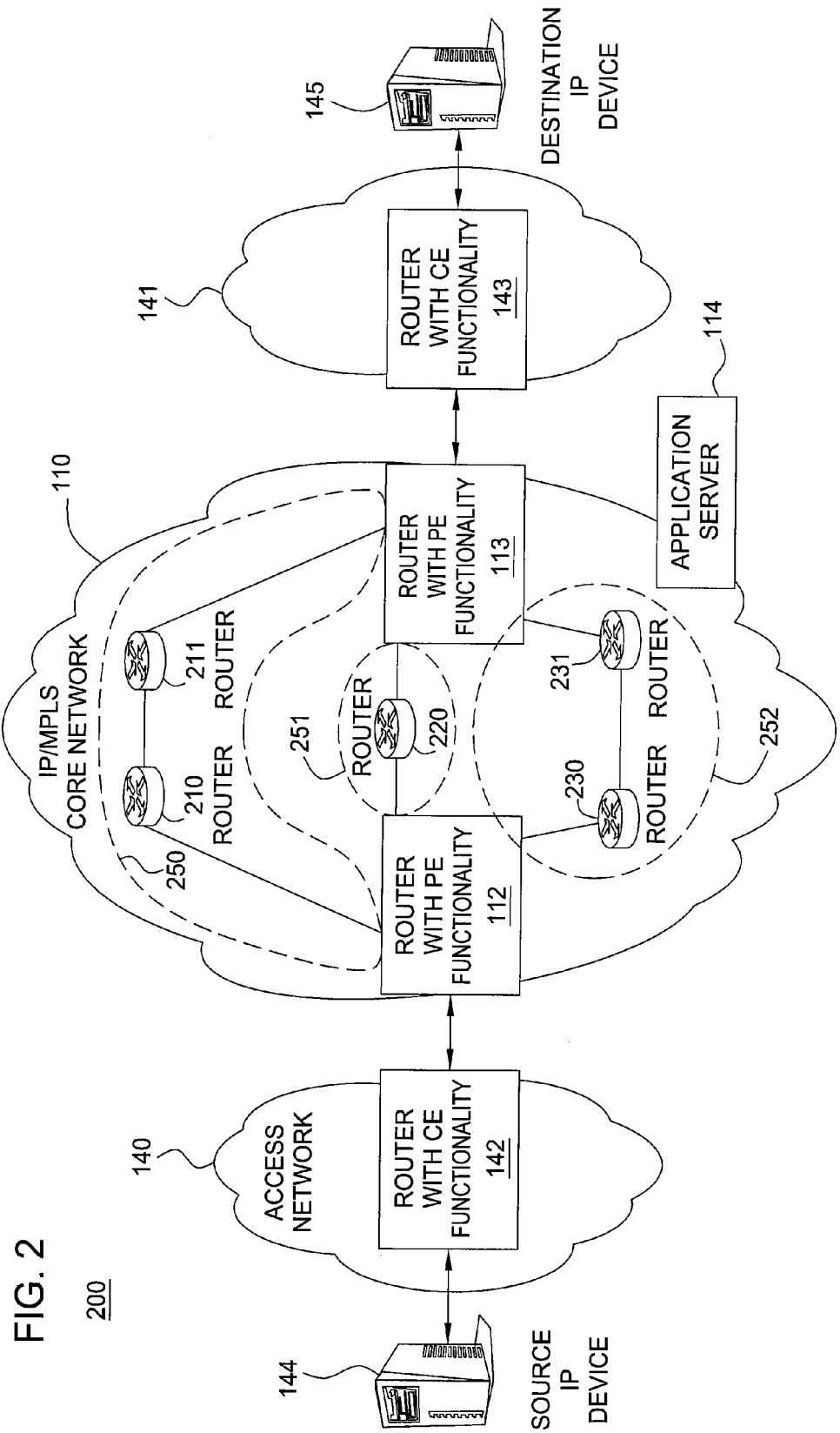
FIG. 2 illustrates an exemplary network with the current invention for isolating LSP impairments.

FIG. 2 illustrates an exemplary network 200 in accordance with one embodiment of the present invention for isolating LSP impairments. For example, an enterprise customer is using an IP device 144 to access services such as VoIP and SoIP services. IP device 144 is connected to an access network 140 (LAN). The access network 140 contains a gateway router 142. The gateway router 142 is connected to an IP/MPLS core network 110 through a border element 112. The enterprise customer also has a user at a remote location using an IP device 145 to access services. The IP devices 145 is connected to the access network 141 (e.g., a remote LAN). The access network 141 contains a gateway router 143. The gateway router 143 is also connected to the IP/MPLS core network 110 through a border element 113. In one embodiment, the CE functionality is provided in the gateway routers 142 and 143. The PE functionality is provided in the border elements 112 and 113. Packets transmitted by IP device 144 traverse the IP/MPLS core network towards IP device 145 via one of the label switched paths 250, 251 or 252. Label switched path 250 connects PE devices 112 and 113 via routers 210 and 211. Label switched path 251 connects PE devices 112 and 113 via router 220. Label switched path 252 connects PE devices 112 and 113 via routers 230 and 231. The PE devices 112 and 113 are used as Label Edge Routers (LER). An application server 114 is also deployed in the IP/MPLS core network. In one embodiment, the service provider utilizes the application server 114 to implement the present invention for isolating LSP impairments. It should be noted that although FIG. 2 only shows three LSPs, the present invention is not so limited. In practice, there could be hundreds or even thousands of LSPs.

In one embodiment, the service provider is capable of detecting impairments. For example, the service provider may receive a report or a notification from a customer or from a network monitoring device (e.g., a dedicated application server, a trouble ticket reporting system, a call monitoring system, and so on) that a potential impairment may exist. In one embodiment, detecting an impairment comprises initially identifying the source and destination devices and then determining whether routers specified in one or more LSPs between the source and destination devices are exchanging label mapping information properly. For the above example, the PE device 112 can be identified as a source PE, whereas PE device 113 can be identified as a destination PE. In brief, the application server 114 recursively verifies that LDP is enabled and operational between the source and destination PE devices.

In one embodiment, the application server 114 accesses the source and destination PE devices and retrieves their IP addresses. For example, the application server may use a Domain Name Server (DNS) to determine IP addresses. The application server then accesses the source PE device and identifies the next routers (e.g., next hops) and interfaces towards the destination PE for each LSP. The application server then verifies that LDP is enabled and operational on all the interfaces that have been identified. More broadly, whether the interfaces are properly enabled for exchanging label mapping information. In one embodiment, verification of enabled LDP comprises determining whether or not the LDP is configured. The operational aspect determines whether or not there are failures. The application server then accesses each of the routers identified as next routers (next hops), verifying whether or not LDP is enabled and operational, and so on. The method recursively verifies each LSP leading to the destination PE device.

In one embodiment, the method also verifies at each step whether or not the label is corrupted.

Figure 3:
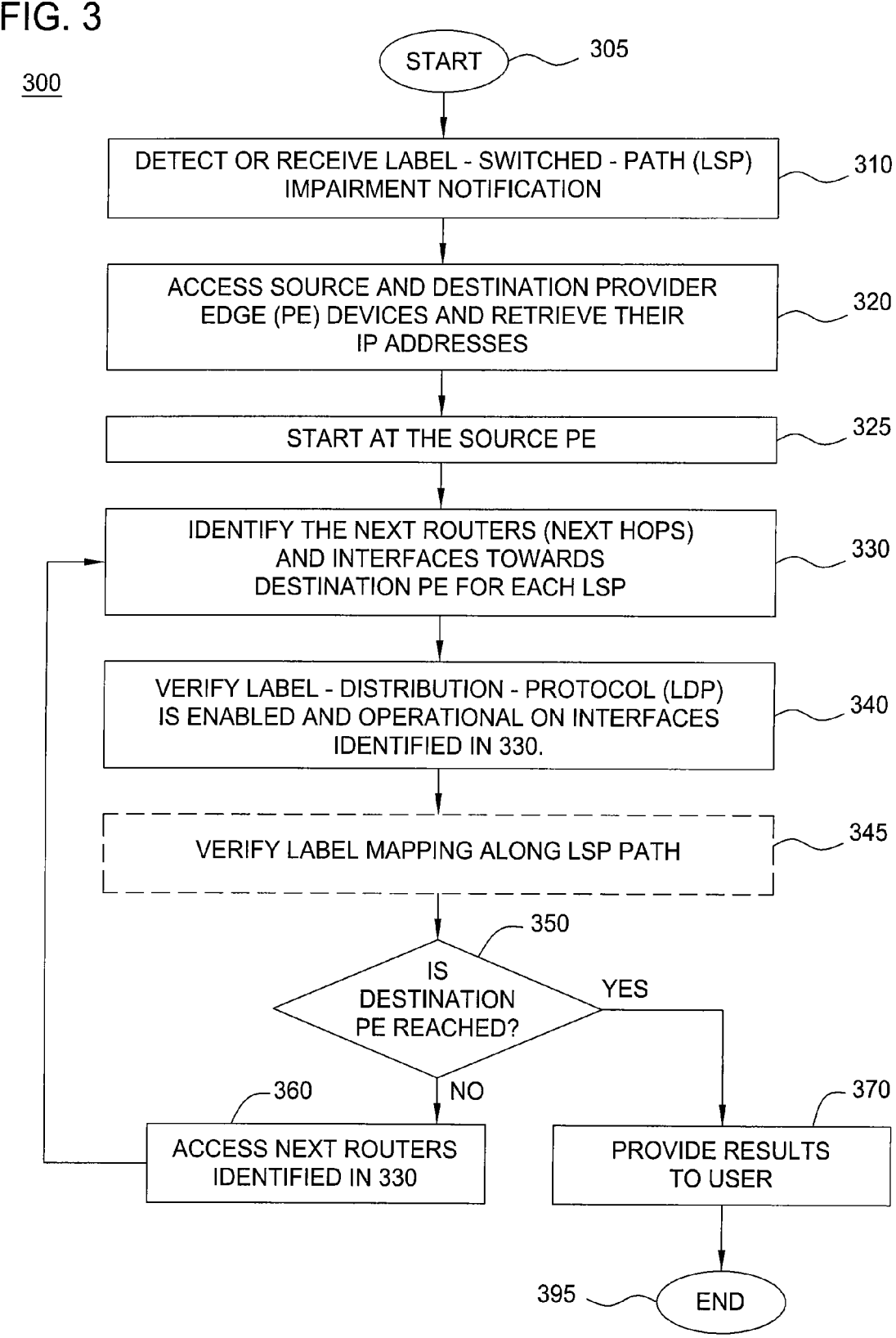
FIG. 3 illustrates a flowchart of a method for isolating LSP impairments.

FIG. 3 illustrates a flowchart of a method 300 for isolating LSP impairments. For example, a service provider may implement the present method for isolating LSP impairments in an application server. Specifically, the service provider may enable the application service to receive reports of potential impairments from customers, users, monitoring devices, etc. The service provider may then enable users (e.g., maintenance personnel, etc.) to input source and destination devices for diagnosing LSP impairments. For example, a user may provide the source and destination PE devices to the application server as an inputs.

Method 300 starts in step 305 and proceeds to step 310. In step 310, method 300 detects or receives a notification of a potential impairment. For example, the service provider may receive a report from a customer or from a network monitoring device. The detected impairment notification may also identify the source and destination PE devices. For example, if a customer reports a problem, operations personnel may determine and provide the DNS names of the source and destination PE devices to the application server performing trouble isolation for LSP impairments. For the example in FIG. 2, the PE device 112 is identified as a source PE and PE device 113 is identified as a destination PE.

In step 320, method 300 accesses the source and destination PE devices and retrieves their IP addresses. For example, the application server may utilize a Domain Name Server (DNS) to determine IP addresses associated with DNS names.

In step 325, method 300 starts at the source PE.

In step 330, method 300 identifies the next routers (e.g., next hops) and interfaces towards the destination PE for each LSP. For example, the method issues commands to the source PE that returns a list of next routers (next hops) and interfaces leading to those next routers. The particular command will vary based on the router being used. For example, some routers may use "show IP route x.x.x.x", where x.x.x.x represents the IP address of the destination PE. The response may include the IP addresses of the next routers towards the destination PE router (identified as x.x.x.x) and the interfaces leading to those routers and so on.

In step 340, method 300 automatically verifies that LDP is enabled and operational on the interfaces identified in step 330. Verification of enabled LDP comprises determining whether or not the LDP is configured correctly. Namely, the operational aspect determines whether or not the interface is working properly. For example, a router may support a command that returns LDP interface status. For example, a router may receive a "show MPLS interface" command and responds with a list as illustrated in Table-1 below. The interlace types are represented by "y." For example "y" may represent Packet-over-Synchronous Optical Network (POS). Proper responses to one or more commands are indicative of enabled LDP. More broadly, a router is deemed to be enabled if the router is responsive to one or more commands that are indicative that the router is performing its label mapping exchange function properly.

TABLE-1

An Example of a Response to LDP status request

| Interface | LDP Enabled | LDP Operational |
|---|---|---|
| y 1/0/0 | Yes | Yes |
| y 11/0/0 | Yes | Yes |

It should be noted that step 340 is performed automatically. Namely, once the source and destination devices are identified, step 340 is performed automatically for all LSPs. Namely, there is no need to receive manual inputs from the user as to each of the LSPs.

In optional step 345, method 300 may verify label mapping along LSP paths. For example, the method may verify whether or not an "in label" at a router matches an "out label" of a previous router verified along the LSP path. For example, the response to LDP status request may include labels attached to the paths.

In step 350, method 300 determines whether or not the destination PE has been reached. If the destination PE has been reached, then the method proceeds to step 370. Otherwise, the method proceeds to step 360. For example, if one LSP has one (1) router while another LSP has two (2) routers between the source and destination PE devices, then the trouble isolation on the LSP with one router between the source and destination PE devices may be completed prior to that of the LSP with two or more routers between the source and destination PE devices.

In step 360, method 300 accesses the next routers identified in step 330. For example, method 300 uses the IP addresses and remotely accesses the routers. The method then proceeds back to step 330 to repeat the process of identifying next routers and interfaces to those routers, and so on. The method automatically and recursively verifies LDP status for each LSP leading to the destination PE device.

In step 370, method 300 provides results to a user. For example, if no problems are found, method 300 may report "no LDP problems found." If problems are identified, then the method may provide a list of IP addresses and interfaces where trouble has been isolated. If label mapping is verified, the method may also identify and provide the list of routers with label mapping problem. The method then proceeds to step 395 to end the current process or it may return to step 310 to receive the next LSP impairment notification.

In one embodiment, the current invention may also validate MPLS forwarding table, e.g., verifying whether an "out label" at a tested router matches the "in label" of the next hop router along an LSP from source to destination PE, verify consistency of routing table and CEF table, etc.

Note that in the above embodiment, the verification of LDP status for the various LSP' may be performed in parallel. Furthermore, the method may verify label mapping in parallel with verification of LDP status. In one embodiment, the user may obtain results while the verification is being performed. For example, a report may be generated as trouble is isolated for each LSP or LSP is checked end-to-end.

Figure 4:
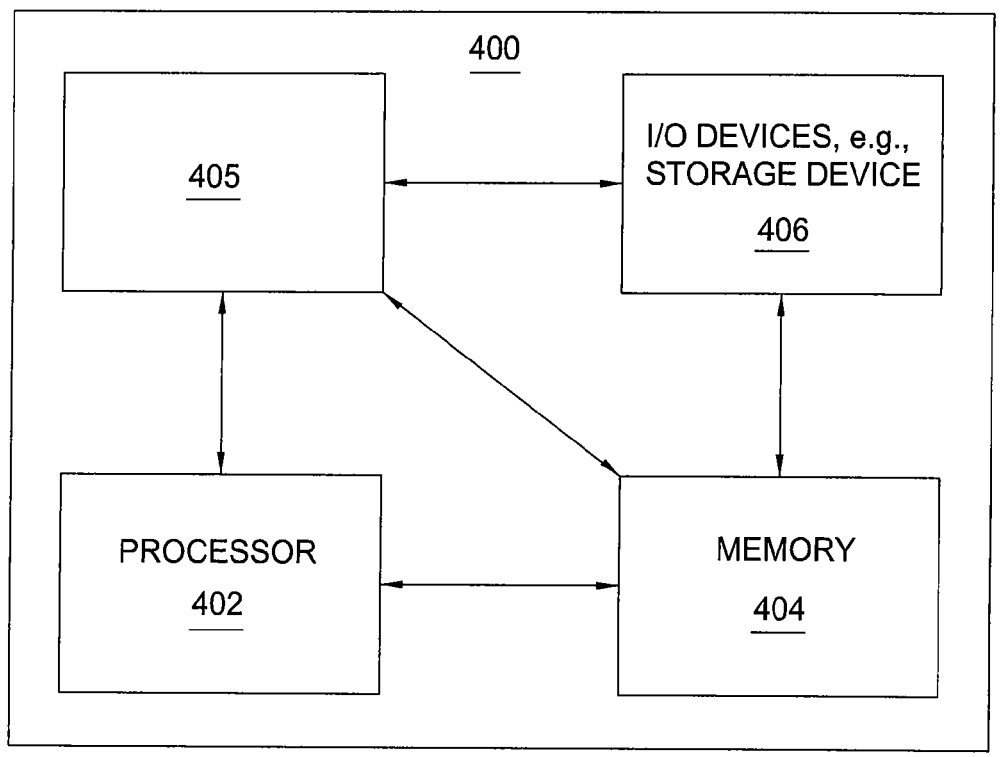
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for isolating label-switched-path impairments, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module for isolating label-switched-path impairments or process 405 can be loaded into memory 404 and executed by processor 402 to implement the functions as discussed above. As such, the present method 405 for isolating label-switched-path impairments (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for isolating a potential impairment in a communication network, comprising:
   receiving, by a processor of an application server, an impairment notification indicating the potential impairment for one of a plurality of label switched paths between a source device and a destination device, wherein the source device and the destination device are provider edge routers;
   obtaining, by the processor, internet protocol addresses of the source device and the destination device;
   identifying, by the processor, all routers along each of the label switched paths;
   determining automatically, by the processor, whether each of the routers for each of the label switched paths is configured to exchange label mapping information, wherein the determining comprises receiving a separate label distribution protocol interface status for each of a plurality of interfaces of each of the routers for each of the label switched paths towards the destination device, wherein each of the plurality of interfaces is associated with one of the label switched paths, wherein each label distribution protocol interface status for an interface includes an indication as to whether a label distribution protocol is enabled and whether the label distribution protocol is operational on the interface;
   verifying, by the processor, label mapping for each of the label switched paths, wherein the verifying comprises determining whether an out label on a tested router matches an in label of a next hop router along each of the label switched paths; and identifying, by the processor, one of the plurality of label switched paths as being impaired when a router on the one label switched path is determined to be not configured to exchange label mapping information.

2. The method of claim 1, wherein the communication network is a packet network.

3. The method of claim 1, wherein the exchanging label mapping information is performed in accordance with a label distribution protocol.

4. The method of claim 1, wherein the impairment notification is received from a user.

5. A non-transitory computer-readable medium storing a plurality of instructions which, when executed by a processor of an application server, cause the processor to perform operations for isolating a potential impairment in a communication network, the operations comprising:
impairment in a communication network, comprising:
receiving an impairment notification indicating the potential impairment for one of a plurality of label switched paths between a source device and a destination device, wherein the source device and the destination device are provider edge routers;
obtaining internet protocol addresses of the source device and the destination device;
identifying all routers along each of the label switched paths;
determining automatically whether each of the routers for each of the label switched paths is configured to exchange label mapping information, wherein the determining comprises receiving a separate label distribution protocol interface status for each of a plurality of interfaces of each of the routers for each of the label switched paths towards the destination device, wherein each of the plurality of interfaces is associated with one of the label switched paths, wherein each label distribution protocol interface status for an interface includes an indication as to whether a label distribution protocol is enabled and whether the label distribution protocol is operational on the interface;
verifying label mapping for each of the label switched paths, wherein the verifying comprises determining whether an out label on a tested router matches an in label of a next hop router along each of the label switched paths; and
identifying one of the plurality of label switched paths as being impaired when a router on the one label switched path is determined to be not configured to exchange label mapping information.

6. The non-transitory computer-readable medium of claim 5, wherein the exchanging label mapping information is performed in accordance with a label distribution protocol.

7. The non-transitory computer-readable medium of claim 5, wherein the impairment notification is received from a user.

8. An apparatus for isolating a potential impairment in a communication network, comprising:
a processor of an application server; and
a computer-readable medium storing a plurality of instructions which, when executed by the processor, cause the processor to perform operations, the operations comprising:
receiving an impairment notification indicating the potential impairment for one of a plurality of label switched paths between a source device and a destination device, wherein the source device and the destination device are provider edge routers;
obtaining internet protocol addresses of the source device and the destination device;
identifying all routers along each of the label switched paths;
determining automatically whether each of the routers for each of the label switched paths is configured to exchange label mapping information, wherein the determining comprises receiving a separate label distribution protocol interface status for each of a plurality of interfaces of each of the routers for each of the label switched paths towards the destination device, wherein each of the plurality of interfaces is associated with one of the label switched paths, wherein each label distribution protocol interface status for an interface includes an indication as to whether a label distribution protocol is enabled and whether the label distribution protocol is operational on the interface;
verifying label mapping for each of the label switched paths, wherein the verifying comprises determining whether an out label on a tested router matches an in label of a next hop router along each of the label switched paths; and
identifying one of the plurality of label switched paths as being impaired when a router on the one label switched path is determined to be not configured to exchange label mapping information.

* * * * *